US011501353B1

(12) United States Patent
Boyapati et al.

(10) Patent No.: US 11,501,353 B1
(45) Date of Patent: Nov. 15, 2022

(54) SYSTEM AND METHODS FOR ADJUSTING PRESENTATION ACROSS DEVICES TO ACCOUNT FOR DIFFERENT PROCESSING TIMES

(71) Applicant: Amazon Technologies, Inc., Seattle, WA (US)

(72) Inventors: Sridhar Boyapati, Sammamish, WA (US); Felix Joseph Etienne Pageau, Seattle, WA (US); Benjamin Ralph Hollis, Seattle, WA (US); Alexander Michael McNamara, Seattle, WA (US); Natalie Thuy-Tien Nguyen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 432 days.

(21) Appl. No.: 16/592,706

(22) Filed: Oct. 3, 2019

Related U.S. Application Data

(62) Division of application No. 14/101,184, filed on Dec. 9, 2013, now Pat. No. 10,438,259.

(51) Int. Cl.
*G06Q 30/06* (2012.01)
(52) U.S. Cl.
CPC .............. *G06Q 30/0623* (2013.01)
(58) Field of Classification Search
None
See application file for complete search history.

(56) References Cited

U.S. PATENT DOCUMENTS

| 4,965,825 | A | 10/1990 | Harvey et al. |
| 5,625,816 | A | 4/1997 | Burdick et al. |
| 5,964,841 | A | 10/1999 | Rekhter |
| 6,762,681 | B1 * | 7/2004 | Danelski .............. G06Q 10/087 340/568.1 |
| 7,225,980 | B2 | 6/2007 | Ku et al. |
| 7,349,967 | B2 | 3/2008 | Wang |
| 7,721,001 | B1 * | 5/2010 | Flood .................... H04J 3/0655 709/248 |
| 7,949,568 | B2 | 5/2011 | Fano et al. |
| 3,009,864 | A1 | 8/2011 | Linaker et al. |

(Continued)

OTHER PUBLICATIONS

Weaver, K.A., Baumann, H., Starner, T., Iben, H. and Lawo, M., An empirical task analysis of warehouse order picking using head-mounted displays, Apr. 2010, In Proceedings of the SIGCHI Conference on Human Factors in Computing Systems, pp. 1695-1704. (Year: 2010).*

(Continued)

*Primary Examiner* — Jeffrey A. Smith
*Assistant Examiner* — Brittany E Bargeon
(74) *Attorney, Agent, or Firm* — Athorus, PLLC

(57) ABSTRACT

Described is a system and method for propagating and synchronizing the presentation of user specific information across multiple output devices. In some implementations, a location of a user is determined and user specific information is provided to a plurality of output device controllers configured to control output devices at the determined location. Control instructions are also provided instructing the output device controllers to store, render, present and/or remove the user specific information.

20 Claims, 11 Drawing Sheets

(56) References Cited

U.S. PATENT DOCUMENTS

| | | | |
|---|---|---|---|
| 8,167,723 B1* | 5/2012 | Hill | G07F 17/3227 |
| | | | 463/42 |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,463,665 B1 | 6/2013 | Pape et al. | |
| 8,630,924 B2 | 1/2014 | Groenevelt et al. | |
| 8,688,598 B1 | 4/2014 | Shakes et al. | |
| 9,442,934 B2 | 9/2016 | Matoba | |
| 9,473,747 B2 | 10/2016 | Kobres et al. | |
| 2002/0010519 A1 | 1/2002 | Watanabe et al. | |
| 2002/0055893 A1 | 5/2002 | Mizumachi et al. | |
| 2003/0002712 A1 | 1/2003 | Steenburgh et al. | |
| 2004/0008155 A1 | 1/2004 | Cok | |
| 2004/0093268 A1* | 5/2004 | Ramchandani | G06Q 30/02 |
| | | | 705/14.13 |
| 2004/0181467 A1* | 9/2004 | Raiyani | G06Q 10/087 |
| | | | 705/28 |
| 2005/0071842 A1* | 3/2005 | Shastry | G06F 9/5038 |
| | | | 718/100 |
| 2005/0091126 A1 | 4/2005 | Junger | |
| 2006/0058915 A1 | 3/2006 | Sheehan et al. | |
| 2006/0109113 A1 | 5/2006 | Reyes et al. | |
| 2007/0206547 A1 | 9/2007 | Gong et al. | |
| 2007/0273507 A1 | 11/2007 | Burchell et al. | |
| 2008/0055087 A1 | 3/2008 | Horii et al. | |
| 2008/0065235 A1 | 3/2008 | Igoe et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2010/0017711 A1 | 1/2010 | Aso et al. | |
| 2010/0100822 A1 | 4/2010 | Aaron et al. | |
| 2010/0121480 A1 | 5/2010 | Stelzer et al. | |
| 2011/0011936 A1 | 1/2011 | Morandi et al. | |
| 2012/0072626 A1 | 3/2012 | Scott et al. | |
| 2012/0120871 A1 | 5/2012 | Jaeger | |
| 2012/0120954 A1* | 5/2012 | Mentze | H04L 43/10 |
| | | | 370/390 |
| 2012/0232689 A1 | 9/2012 | Buchmann et al. | |
| 2012/0284132 A1 | 11/2012 | Kim et al. | |
| 2013/0073666 A1 | 3/2013 | Matoba | |
| 2013/0076898 A1 | 3/2013 | Philippe et al. | |
| 2013/0100852 A1 | 4/2013 | Jeon et al. | |
| 2013/0154809 A1 | 6/2013 | Subramanian et al. | |
| 2013/0163382 A1* | 6/2013 | Millar | G01S 13/46 |
| | | | 367/127 |
| 2013/0169817 A1 | 7/2013 | Jones et al. | |
| 2013/0211977 A1 | 8/2013 | Lyon et al. | |
| 2013/0253700 A1 | 9/2013 | Carson et al. | |
| 2013/0268401 A1 | 10/2013 | Choi et al. | |
| 2013/0338819 A1 | 12/2013 | Max | |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Anonymous, Leading Supplier of Communication Systems Add Mobile Data Collection Solutions from Vertex Interactive Inc, Mar. 19, 2002, Business Wire, p. 2. (Year: 2002).

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

SYSTEM AND METHODS FOR ADJUSTING PRESENTATION ACROSS DEVICES TO ACCOUNT FOR DIFFERENT PROCESSING TIMES

PRIORITY CLAIM

This application is a Divisional of U.S. patent application Ser. No. 14/101,184, filed Dec. 9, 2013, and titled "Propagating And Presenting User Specific Information," the contents of which are herein incorporated by reference in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
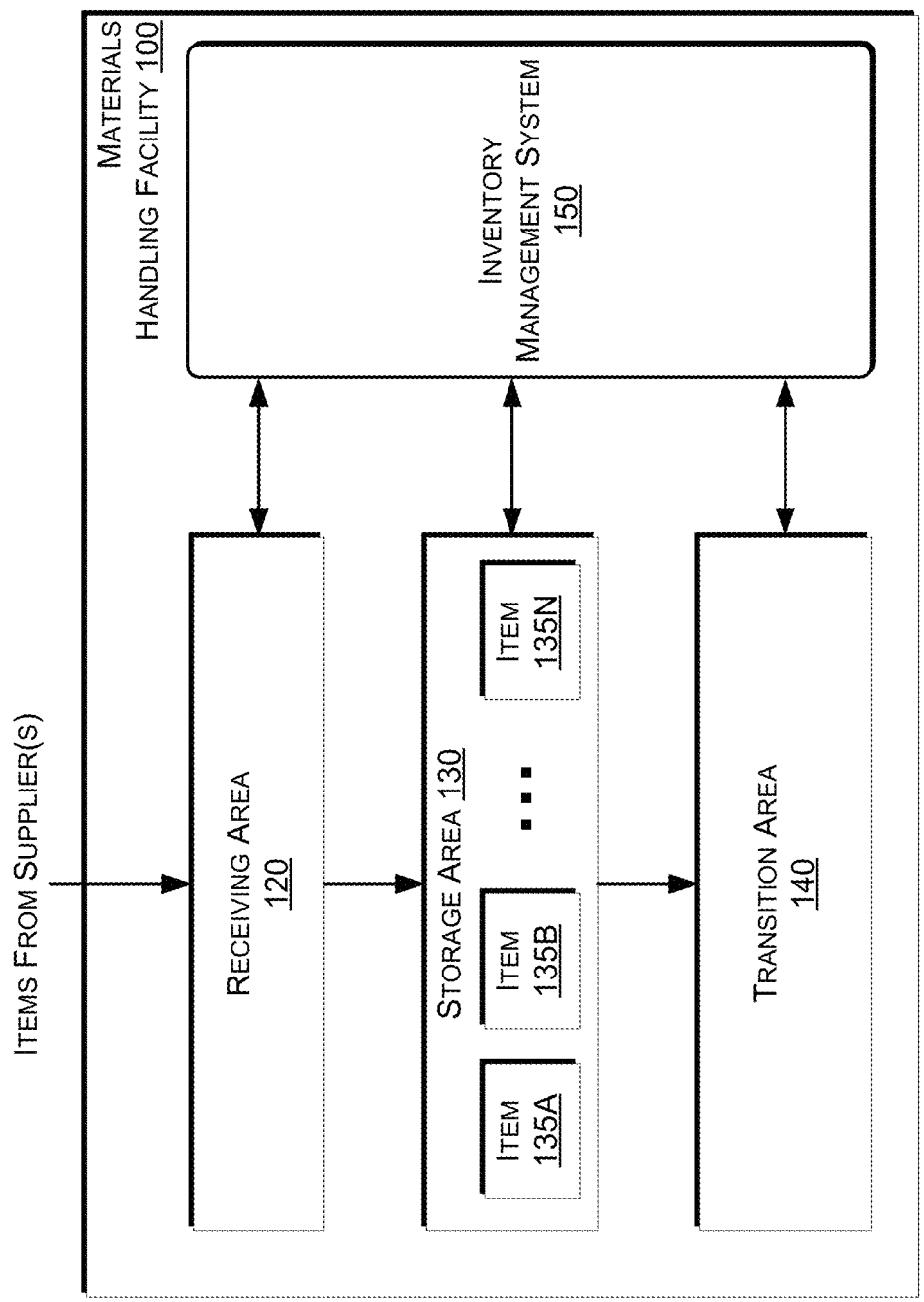
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for presenting user specific information to a user via multiple displays and transitioning that information between displays as the user moves through a materials handling facility. In one implementation, a location of a user in the materials handling facility is determined, user specific information identified and the user specific information provided to display controllers that control the presentation of content on displays that are located near the user. In addition to providing the user specific information to the display controller(s), control instructions may be provided that instruct the display controller to pre-cache or otherwise store the user specific information, render the user specific information (e.g., on a virtual display) or present the user specific information on a display.

By proactively providing the user specific information to display controllers and instructing the display controllers to pre-cache, render and/or present the user specific information, the user specific information is available and can be quickly presented to the user if desired. In implementations where there are multiple displays adjacent to one another, user specific information and control instructions may be provided to each respective display controller (a display controller may control more than one display) and different control instructions may be provided for each display. For example, the user specific information may be provided to three different display controllers, each display controller controlling one or more displays. Likewise, control instructions may be provided to each display controller instructing the display controller to perform one or more actions with respect to the provided user specific information. For example, the display controller that controls the display closest to the user may receive instructions to render and present the user specific information on the display. The display controller controlling the display adjacent to the display that is presenting the user specific information may receive control instructions to pre-cache and render the user specific information, but not present it. Likewise, the third display controller may receive control instructions to pre-cache the user specific information. In this manner, as the user moves locations between the displays, the user specific information can be quickly and seamlessly presented and transitioned among multiple displays. For example, if the user begins moving, instructions may be sent to the second display controller instructing the second display controller to present the user specific information on the second display. Likewise, instructions may be send to the first display controller to stop presenting the user specific information but keep it rendered and available, and instructions may be sent to the third display controller to render the pre-cached user specific information.

As discussed in more detail below, some materials handling facilities may include numerous (e.g., hundreds or thousands) of displays or other output devices and likewise may have numerous users located within the materials handling facility at any time. The systems described herein can monitor the location of each user within the materials handling facility and provide user specific information, specific to each user, to display controllers controlling displays near those users, along with control instructions identifying actions to be performed with respect to the provided user specific information. In many instances, the user specific information will not be presented to the user and the user may move into other areas of the materials handling facility. As the user moves, additional display controllers will be provided the user specific information along with control instructions associated with the user specific information. Likewise, the display controllers that already have the user specific information may receive control instructions to remove or invalidate the user specific information as it is no longer needed by those display controllers. This process of updating and removing user specific information at various different display controllers within the materials handling facility provides the ability to effectively deliver and present user specific information to a user when it is desired by the user without the delay of having to transmit and render the information before it can be presented.

While the above example discusses the use of displays and display controllers, in other implementations the user specific information may be provided to and/or presented by other output devices. For example, rather than a display, the user specific information may be projected onto a surface for presentation to a user, presented audibly, presented on a portable device of the user, etc. Accordingly, an "output device" as used herein represents any form of output device that may be used to present information to a user. For example, the output device may be a display (e.g., LCD, plasma, LED), projector, speaker, and the like. In each instance, the output device may be controlled by and/or include an output device controller, such as a display controller. User specific information may be provided to the output device controller and the output device controller may store, remove, render or present the user specific information. In some implementations, the output device controller may control multiple output devices.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

Figure 2:
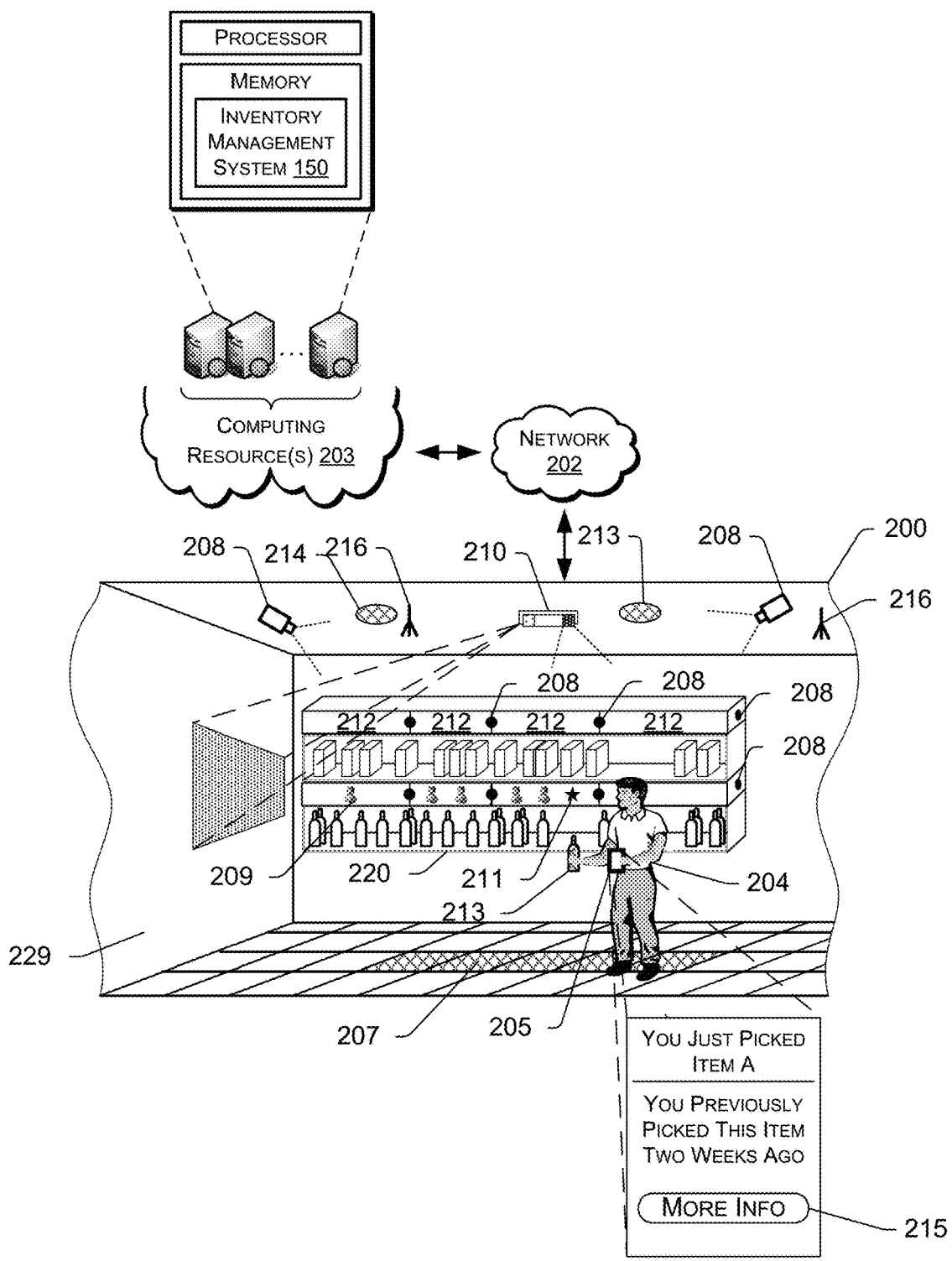
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to camera's, other input devices, such as pressure sensors, infrared sensors, a scale, a light curtain, etc. may be utilized with the implementations described herein. For example, a pressure sensor and/or a scale may be used to detect when an item is added and/or removed from inventory locations.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than, or in addition to, processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204, any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc. to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202.

The following is an example use case for propagating and displaying user specific information on displays 212 based on the movement of the user within the materials handling facility 200. As used herein, user specific information may by any information that includes, at least partially, information that is selected based on the user and/or the location of the user within the materials handling facility. For example, user specific information may include a pick list of items to be picked by the user, recommended items, suggested items, items that pair well with picked items, an identification of items in the user's tote, information about items near the location of the user, information about an item picked by the user, etc.

When a user enters the materials handling facility, the inventory management system 150 may identify the user 204 (e.g., facial recognition, user ID card, user provided information, biometrics). Upon identifying the user 204, a user profile may be retrieved from a user data store. The user profile may include, among other information, item pick history, item view history, purchase history, associations with other users, etc.

The location of the user within the materials handling facility may also be determined. In some implementations, the orientation, direction and/or speed of the user's movement through the materials handling facility may also be determined. Based on the location of the user, one or more displays 212 are determined that are near the user and user specific information is provided to the display controller(s) that are configured to control the determined displays. In some implementations, the number and/or selection of displays for which user specific information is provided may be determined based on the user, the location of the user within the materials handling facility, the orientation of the user, the direction in which the user is moving and/or the speed at which the user is moving.

For example, if the user is moving west through the materials handling facility down an aisle between two sets of shelves at approximately four miles per hour and is on the right side of an aisle, the inventory management system 150 may select a display on the north shelf that is closest to the user, referred to as display 0, five displays on the north shelf that are west of display 0, referred to as display 1, 2, 3, 4, 5 and two displays on the north shelf east of display 0, referred to as display A and display B.

For the selected displays, the user specific information may be provided to the respective display controllers along with control instructions identifying the action(s) to be performed with respect to the user specific information. For example, the control instructions for the display controller configured to control display 0 may instruct the display controller to render and display on display 0 the user specific information. The control instructions for display 1, display 2, display 3, display A, and display B may include instructions to render but not display the user specific information. For example, display 1, display 2, display 3 and display A and display B may render the user specific information on a virtual display so that if it is requested it can be quickly presented on a display. Likewise, display 4 and display 5 may receive control instructions to pre-cache or otherwise store the user specific information but not render it.

As the user moves through the materials handling facility, additional control instructions and/or updated user specific information may be provided to one or more of the display controllers. For example, if the user continues moving to the west, control instructions may be presented to the display controllers that control display 4 and display 5 to render the previously stored user specific information. Display 0 may receive control instructions to stop presenting the user specific information but to keep it rendered. Display A and display B may receive control instructions to delete, remove or otherwise invalidate the user specific information, thereby making memory available. Likewise, the user specific information may be provided to additional display controllers configured to control displays farther west (e.g., display 6 and display 7) along with control instructions identifying the actions to be performed by the display controllers with respect to the user specific information.

This process of providing user specific information and control instructions may continue as the user moves throughout the materials handling facility so that the user specific information can be quickly presented to the user if desired. In some instances, many of the display controllers may never actually present the user specific information. For example, control instructions to present the user specific information may only be presented if the user stops and/or looks toward a display. In other implementations, initial user specific information, such as a user identifier, path identifier, etc. may be presented on the displays to assist in guiding the user through the materials handling facility. If the user looks at a display, the initial user specific information may be supplemented to present additional user specific information to the user. For example, in addition to presenting a user identifier, the additional user specific information may identify items at or near the display that are to be picked by the user.

In some implementations, the user specific information may include one or more animations that are specific to the user. For example, a user identifier or user path identifier may be presented on the displays in an animated manner that assists in routing the user along a path through the materials handling facility. In some implementations, a user path may exist that the user is to follow through the materials handling facility that passes the user by the location of each item to be picked by the user. The user path may be presented to the user in the form of animations on the display. Utilizing the implementations discussed herein, the animations can transition between displays without visual disruptions to the user. For example, a speed of the user may be determined and used for determining the speed at which an animation for the user is to progress along the displays. An output delay timer may also be established to account for differences in processing speeds, network latency, etc. between output controllers. As the animation speed and output delay timer progress, the presentation of the animation may finish on one display and begin on an adjacent display. In some implementations, there may be a separation between displays, such as an aisle between the displays, etc. In such an implementation, the output delay timer may be adjusted to account for the amount of time it will take the user to move across the separation from one display to another.

Returning to FIG. 2, the user specific information may include information that is unique to the user to assist the user in identify the user path associated with the user. For example, the visual identifier 209 may be unique to the user. The visual identifier may be selected and/or provided by the user, or assigned to the user by the inventory management system 150. If there are multiple users in the same area of the materials handling facility, the appropriate user identifier may be detected by each user so that the user can identify appropriate user path.

As the user moves around the materials handling facility, the inventory management system 150 may assist the user in identifying items and/or discovering information about items by processing images collected by input/output components 208-216 positioned around the materials handling facility and providing or updating user specific information based on the processed images. For example, when the user reaches a location in the materials handling facility 200 that includes an item that is to be picked by the user, a visual identifier may be presented at, on or near the item to be picked. Likewise, additional information may be included and presented as part of the user specific information. For example, the user specific information may include a visual identifier 211 that is presented over the location of the planned item 213 that is to be picked by the user 204.

In addition to, or as an alternative to visual and/or audio location determination and tracking of the user, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In other implementations the portable deice 205 may be detectable and/or communicate with an indoor positioning system. In such an implementation, the portable device 205 may provide the received GPS information to the inventory management system 150. In other implementations the portable deice 205 may be detectable and/or communicate with an indoor positioning system.

Figure 3:
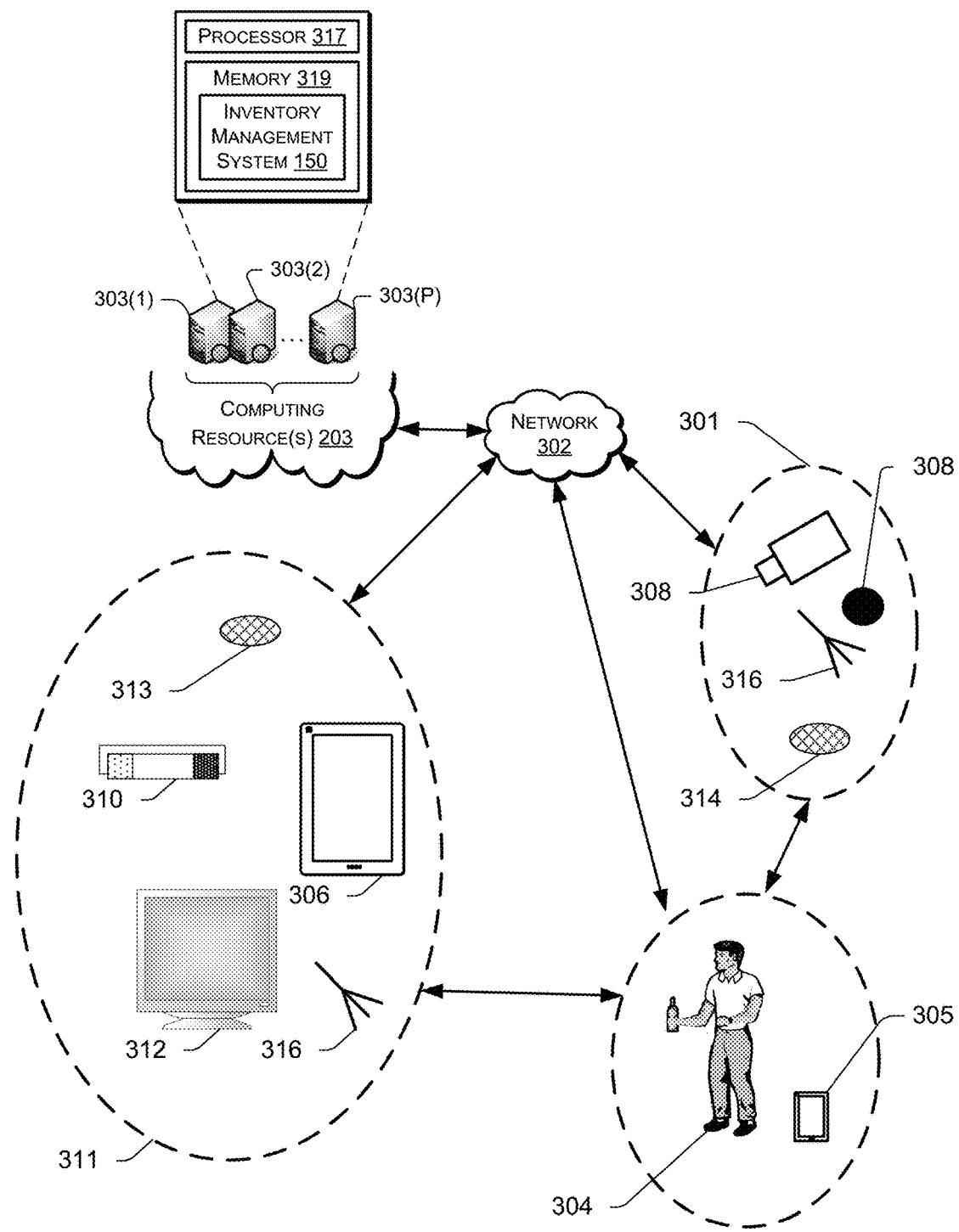
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311 and computing resource(s) 203. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313 and/or any other component that is capable of providing output to the surrounding environment and/or the user.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311 and/or directly with the portable device 305 and/or the user 304.

As illustrated, the computing resource(s) 203 may be remote from the environment and implemented as one or more servers 303(1), 303(2), . . . , 303(P) and may, in some instances form a portion of a network-accessible computing platform implemented as a computing infrastructure of processors, storage, software, data access, and so forth that is maintained and accessible by components/devices of the inventory management system 150 and/or the portable device 305 via a network 302 such as the Internet. For example, the computing resources 203 may process images of users 304 to identify the user 304 and/or to identify gestures presented by the user 304. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
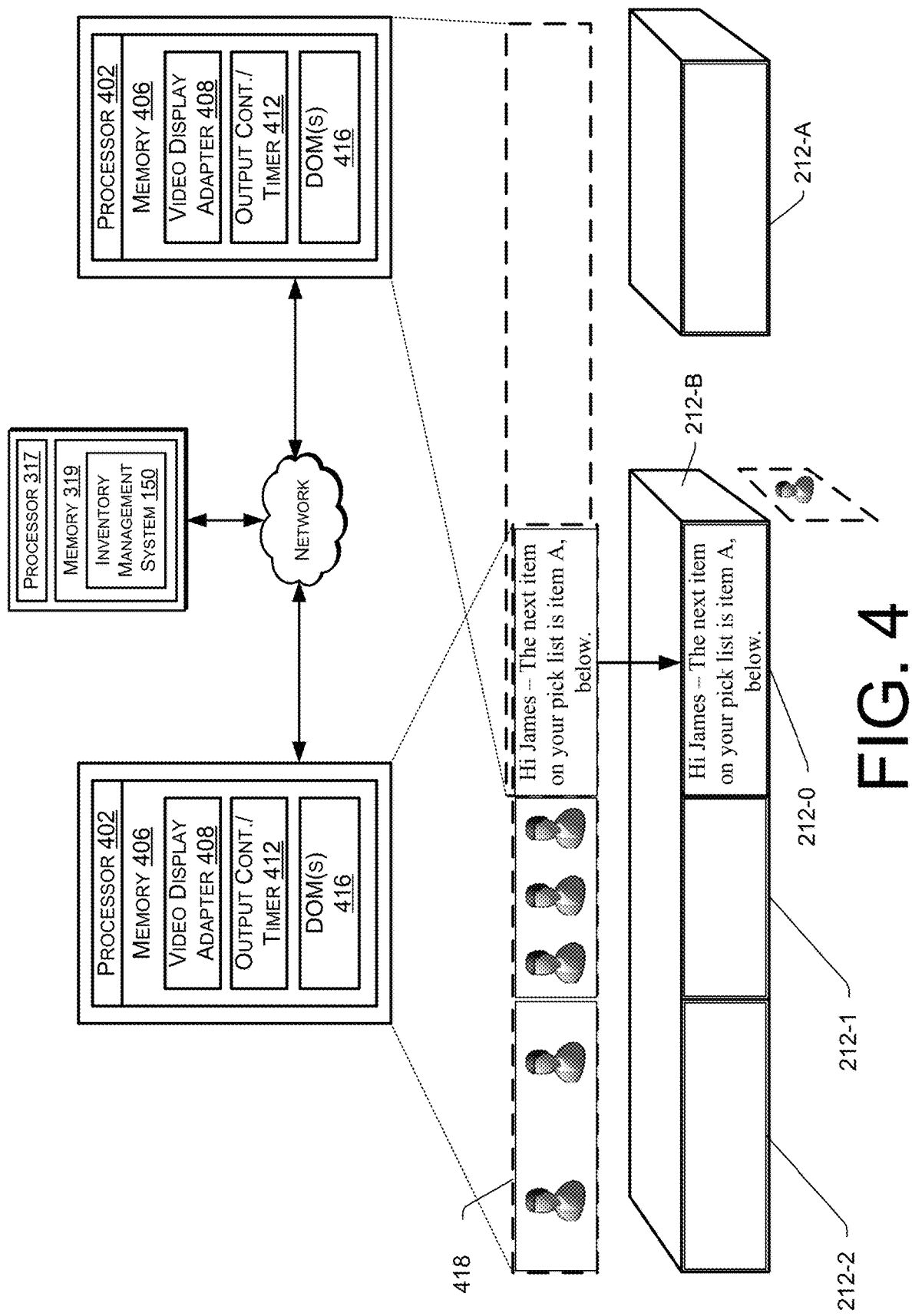
FIG. 4 is a block diagram of multiple output devices within a materials handling facility, according to some implementations.

FIG. 4 is a block diagram of multiple output devices 212-0, 212-1, 212-2, 212-A located within a materials handling facility, according to some implementations. The output devices may be controlled by one or more output device controllers, such as output device controllers 402, 404. Each output device controller 402, 404 is configured to communicate with other output device controllers 402, 404 and/or the inventory management system 150. For example, the output device controllers 402, 404 may communicate to form a peer-to-peer or mesh network, sharing user specific information, propagation patterns, control instructions, timing, etc. For example, the inventory management system 150 may provide user specific information, control instructions and/or propagation instructions to output device controller 402 and output device controller 402 may provide that information to other output device controllers, such as output device controller 404.

In other implementations, the inventory management system 150 may provide user specific information and control instructions to each output device controller. In still other implementations, user specific information, control instructions and/or propagation instructions may be communicated from either or both the inventory management system and other output device controllers.

Each output device controller may be configured to control one or more output devices, such as displays 212, and may include a processor 406 and memory 408. The memory may store one or more components for communicating with the inventory management system 150 via the network and/or for presenting information to the user. For example, the memory 408 may include a video display adaptor 410, an output controller/timer 412, a display identifier 414 and a document object model (DOM) store 416 for storing the document object model and/or the user specific information for each output device that the output device controller is configured to store.

The video display adapter 410 is configured to provide display signals to a display 212 for presenting user specific information on the display. As discussed below, the user specific information may be included in the DOM for the output device and the information identified in the DOM rendered and presented on or by the output device.

In some implementations, the output device controller 402, 404 may control multiple output devices 212 and maintain a DOM for each output device in the DOM store 416. In addition, the output device controller may maintain a virtual DOM that includes the information presented across multiple output devices. The information included in the virtual DOM may be rendered on a virtual display and segmented into DOMs for each output device represented by the virtual DOM. For example, output device controller 402 is configured to control output devices 212-0, 212-1, and 212-2. The user specific information provided by the inventory management system for each of the output devices may be rendered on a virtual display 418 based on the control instructions received for each of the output devices. In this example, the inventory management system 150 has provided user specific information for output device 212-0, 212-1, 212-2, 212-B and 212-A. The user specific information for each output device may be stored in the DOM store 416. Because the inventory management system 150 has determined that the user is nearest output device 212-0, stopped and is looking at the shelf containing output device 212-2, the inventory management system 150 has provided control instructions to the output device controller 402 to render and present the user specific information on the output device 212-2. In this example, the rendered and presented user specific information states "Hi James—The next item on your pick list is item A, below."

In addition to providing control instructions to render and present user specific information on output device 212-0, the inventory management system 150 has also provided user specific information to output device controllers 402, 404 for output devices 212-1, 212-2, 212-A, 212-B. In this example, because the user was moving west down the aisle, the control instructions instruct output device controller 402 to render the user specific information for output devices 212-1 and 212-2, but not present the user specific information. In response, the output device controller 402 stores the user specific information in the DOM store 416 and renders the user specific information on the virtual display 418.

As illustrated, each item of user specific information may be different. For example, the user specific information for output device 212-0 may include textual information relevant to the user and the location, while the user specific information for output devices 212-1 and 212-2 may include user identifiers that will be presented to the user if the user begins moving west again to assist in guiding the user along a pick path.

In this example, the inventory management system 150 has also provided control instructions to output device controllers 402 and 404 for control of the user specific information for output devices 212-A, 212-B. In this example, the control instructions for the output device 212-A are to store the provided user specific information, while the control instructions for 212-B are to render but not display the user specific information. The control instructions for 212-A only instruct the output device controller 404 to store the user specific information for output device 212-A because the user was moving away from the direction of the output device 212-A and there is a separation between the users current location and the location of output device 212-A. In this example, the separation is an aisle. If the user turns and moves east toward output device 212-A there will be sufficient time as the user crosses the aisle to provide control instructions to render the user specific information and present the user specific information on the display 212-A. Likewise, the control instructions for output device 212-B may include instructions to render the user specific information but not present it because the user is not looking toward the output device 212-B. However, because the output device 212-B is adjacent to output device 212-0 it is close to the user so the information is rendered and ready for presentation in the event the user moves in that direction.

Figure 5:
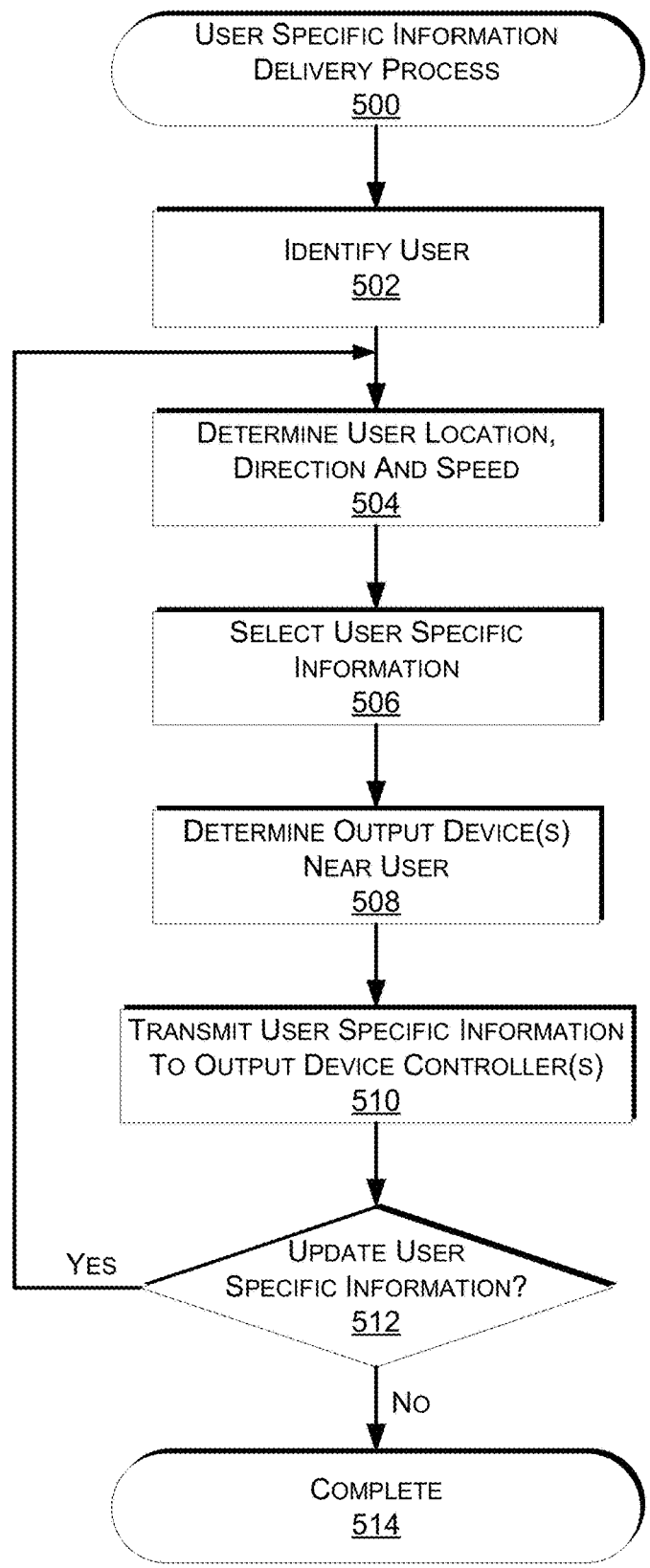
FIG. 5 is a flow diagram of an example user specific information delivery process, according to some implementations.
Figure 6:
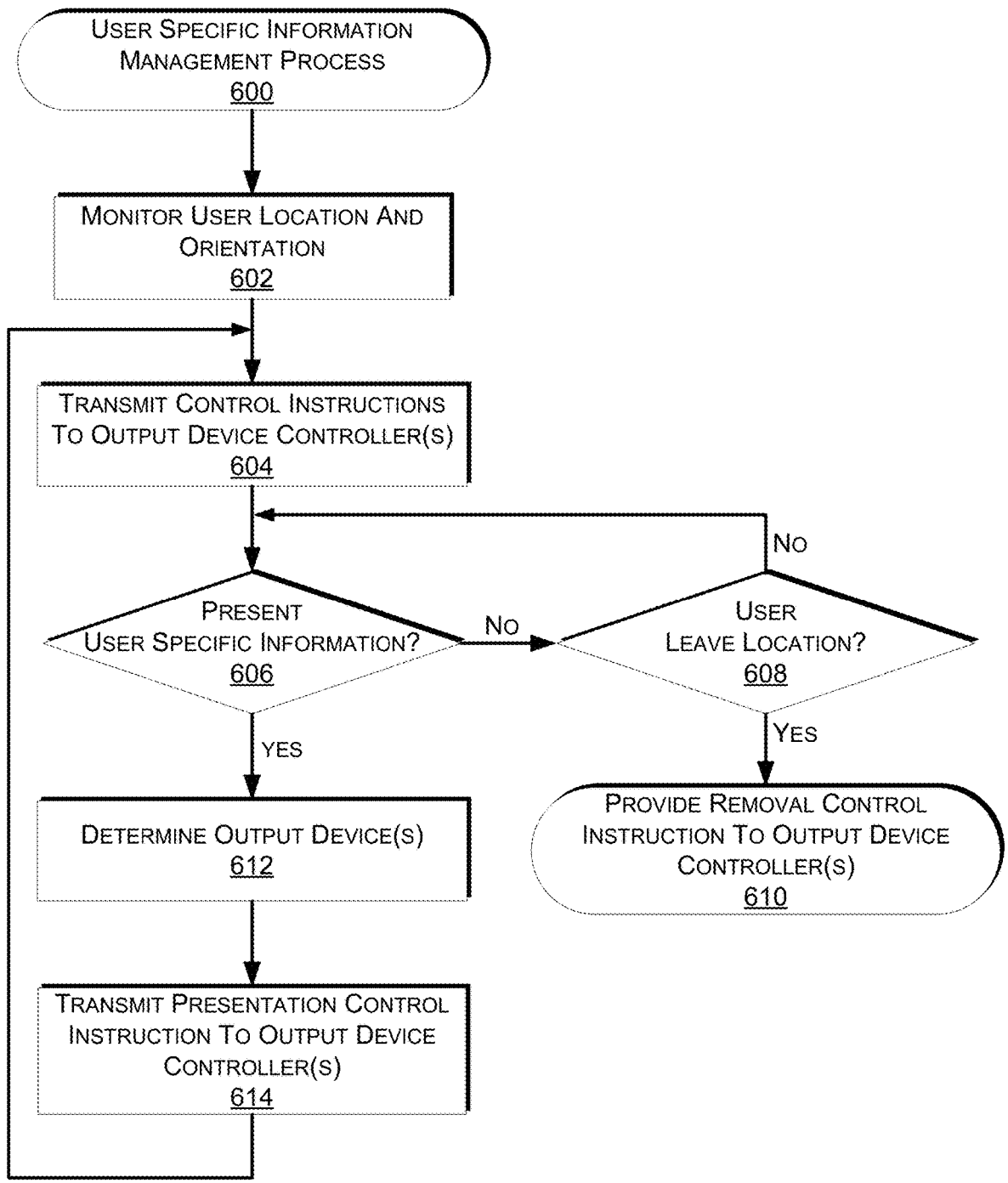
FIG. 6 is a flow diagram of an example user specific information management process, according to some implementations.

FIGS. 5-6 describe an example process for monitoring a user within the materials handling facility, providing user specific information and control instructions to output device controllers configured to control output devices near the user's location and for providing user specific information when desired by the user. The example processes of FIGS. 5-6 are described with respect to a server-client relationship. Specifically, in these examples, the inventory management system operates as the server to control which output device controllers receive user specific information and/or control instructions. For example, the inventory management system 150, may utilize one or more input devices (e.g., image capture devices) to monitor the location, direction, orientation and/or speed of the user and based on that information may query an output data store (discussed below) to identify output devices and corresponding output device controllers. User specific information and/or control instructions are then provided to those output device controllers so that user specific information can be quickly presented to the user and the presentation of user specific information can be synchronized across multiple displays as the user moves through the materials handling facility. The output device controllers operate as the clients, receiving user specific information and/or control instructions from the inventory management system and taking action on the user specific information as instructed in the control instructions.

FIG. 5 depicts a flow diagram of an example user specific information delivery process 500, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by identifying a user in the materials handling facility, as in 502. Various techniques may be used for identifying a user within the materials handling facility. For example, one or more images of the user may be obtained and processed using image and/or facial recognition. The processed images may be compared with stored visual information about the user (e.g., facial features) and used to identify the user. In other examples, a user identifier may be provided by the user and/or detected by the inventory management system 150. A user identifier may be any unique identification that is associated with the user. For example, the user identifier may be an active tag, such as a radio frequency identification ("RFID") tag, visual tag, such as a barcode, bokode, etc., a user provided identifier (e.g., user name and password), biometric identification, or any other type of identifier that may uniquely identify the user.

In some implementations, distinguishing features of the user may also be detected and used to assist in monitoring the user as they move throughout the materials handling facility. For example, if the user is wearing a bright colored shirt, has a tattoo, is wearing a hat, etc., any of those distinguishing features may be detected and used to assist in monitoring the user. Likewise, the user's gate, cadence, body language, speed, etc. may be determined and used to monitor and/or identify the user while in the materials handling facility.

Returning to FIG. 5, in addition to identifying the user, the user's location, direction, and/or speed within the materials handling facility may be determined, as in 504. Similar to user identification, one or more image capture devices may capture images of the user and those images may be processed to determine the orientation, direction and speed of the user within the materials handling facility. Other input devices within the materials handling facility may also be used. For example, one or more pressure and/or weight sensors may be included in the floor of the materials handling facility and used to detect the steps or other movement of the user. Based on a series of detected steps/movement, the orientation, direction and/or speed of the user can be determined.

User specific information that is at least partially unique to the user and/or the current location of the user is also selected, as in 506. User specific information may vary for different users based on user preferences that are included in a user profile associated with the user. For example, a user may provide or be assigned a user identifier that may be presented to illustrate a path (e.g., pick path) the user is to take through the materials handling facility. For example, if the user is to follow a pick path that routes the user through the materials handling facility and past each item to be picked by the user (items on the user pick list), a user identifier that is unique to the user may be included in the user specific information. Likewise, other types of user specific information may be selected for the user. For example, item recommendations, suggestions or pairings with items currently in the user's possession may be identified and included in the user specific information. For example, if the user has a bottle of wine and it is determined that they are in the location of materials handling facility that stores cheese, an item recommendation for a cheese near the user's location may be generated and included in the user specific information.

The form type and content of user specific information may vary for each user. For example, some users may prefer only minimal information about the items at a location or only static representations of user identifiers for providing path guidance. In comparison, some users may be interested in receiving recommendations, item details, past purchase history, advertisements, etc. as part of the user specific information. Likewise, some user specific information may include animations that are presented to the user and/or used to provide path guidance. For example, the user identifier may be animated and follow the user through the materials handling facility providing animated path guidance that is specific to the user.

Based on the user's location within the materials handling facility, one or more output devices are determined, as in 508. In some implementations, a set number of output devices may be selected that are near the user. In one implementation, the six output devices nearest the user may be determined. In other implementations, output devices within a distance (e.g., 5 feet radius around the user) of the user may be determined. In still other implementations, the direction and speed of the user may be considered and used as a factor in selecting output devices. For example, if the user is moving, the direction of the user may be determined and the five output devices that are physically next to and ahead of the user along the current path of the user may be selected. Likewise, the two output devices physically behind the user and along the path of the user may be selected as output devices.

Upon selecting one or more output devices, user specific information is transmitted to the output device controllers configured to control the determined output devices, as in 510. In some implementations, the user specific information may be the same for each output device. In other implementations, some or all of the user specific information may be different for different output devices. For example, a user identifier may be included in the user specific information for each output device, but any item information (e.g., recommended items, item details, advertisements) may be different depending on both the user profile and the location of the output device.

As the user moves through the materials handling facility and/or interacts with items in the materials handling facility, a determination is made as to whether some or all of the user specific information is to be updated, as in 512. For example, if the user picks an item, the user specific information for the output device near the picked item may be updated to include additional information about the picked item. Likewise, user specific information for other output devices may be updated based on the picked item. For example, if the user picks an item, other related items may be identified and user specific information for output devices near those related items may be updated to include information and/or recommendations for the user to identify those related items. If it is determined that the user specific information is to be updated, the example process returns to block 504 and continues. If it is determined that the user specific information is not to be updated, the example process 500 completes, as in 514.

FIG. 6 is a flow diagram of an example user specific information management process 600, according to some implementations. The example process 600 begins by monitoring a user location and orientation within a materials handling facility, as in 602. Similar to identifying a user, discussed above, a variety of techniques may be used to monitor the location and orientation of a user. For example, one or more images of the user may be captured and processed to identify and monitor the location of the user as well as determine the orientation of the user. For example, if a distinguishing identifier (e.g., yellow shirt, tattoo) has been associated with the user, the captured images may be processed using object recognition to identify the distinguishing feature(s). Likewise, the object recognition can be used to determine the orientation of the user. In other examples, other user identifiers may be received and used to monitor the user. Likewise, one or more floor sensors (e.g., weight sensors, pressure sensors, load cells) may be included in the floor and used to determine the orientation of the user. For example, if the user is standing, the floor sensors may be used to determine the location and position of each of the user's feet. The location and position of each foot may be used to determine, or assist in determining, the orientation of the user.

In some implementations, if the user is moving, the speed and direction of the user may also be determined. For example, the processed images and/or information from the floor sensors may be used to determine the direction and speed of the user as they move through the materials handling facility.

Based on the determined location and orientation of the user (and optionally the direction and speed of the user), control instructions are transmitted to one or more output device controllers that are configured to control output devices near the user, as in 604. As discussed above, an output device controller may control one or more output devices. Likewise, the control instructions may be the same or different for each output device. In some implementations, where the output device controller controls multiple output devices, for each output device that will receive the same control instruction (e.g., render but do not display), the control instructions may only be provided once to the output device controller along with output device identifiers identifying the output devices that are to receive the control instructions. In some implementations, the control instructions may include an instruction to render the user specific information, an instruction to pre-cache or otherwise store the user specific information, a control instruction to present the user specific information on the output device and/or a control instruction to delete, invalidate or otherwise remove the user specific information.

The location, orientation, direction and/or speed of the user may be monitored and a determination made as to whether user specific information for any of the output devices is to be presented, as in 606. For example, the user may specify or prefer to only have user specific information presented when they are stopped and looking in the direction of an output device (e.g., looking at an inventory location that includes an output device). In other implementations, if the user is moving, the user identifier may be presented on the output device adjacent to the user and on a select number of output devices in front of the user to assist in providing guidance along a pick path. In some implementations, the user specific information may be animated and transition across multiple output devices as the user moves.

If it is determined that the user specific information is not to be presented, a determination is made as to whether the user has left the location, as in 608. It may be determined that a user has left a location, for example, if the user moves a specific distance away from the output device, if the user moves to another aisle within the materials handling facility, if the user moves to another location within the materials handling facility, if the user leaves the materials handling facility, etc. If it is determined that the user has left the location, control instructions to delete, invalidate or otherwise remove the user specific information are provided to the appropriate output device controllers, as in 610. In some implementations, rather than determining that the user has left the location and/or providing control instructions to the remove the user specific information, the user specific information may expire after a determined period of time. For example, the user specific information may include an expiration timer that identifies to the output device controller when to delete, invalidate or otherwise remove the user specific information. In still another implementation, the user specific information may persist until the output device controller receives new user specific information. In such an example, when the new user specific information is received, the existing user specific information may be deleted, invalidated or otherwise removed. Returning to FIG. 6, if it is determined that the user has not left the location, the example process returns to decision block 606 and continues.

Returning to decision block 606, if it is determined that user specific information is to be presented to the user, the output device(s) nearest the user and/or in the direction of the user's orientation are determined, as in 612. For example, the captured images of the user and/or information obtained for floor sensors may be processed to determine the user's location and/or orientation and the output device data store may be queried to identify the appropriate output device(s) at that location. For the determined output device(s), control instructions may be transmitted to the output device controller configured to control the determined output device instructing the output device controller to present the user specific information, as in 614. Upon transmitting the instructions, the example process 600 returns to block 604 and continues. For example, updated control instructions for adjacent output devices may be transmitted instructing those devices to render stored user specific information.

In some implementations, a determination may be made as to whether the user has interacted with output device. For example, if the output device is a touch-based display, after transmitting the presentation control instructions to the output device controller for a determined output device, the example process 600 may determine if a user input has been received at the output device. If a user input has been received, the output device controller may provide the received input to the inventory management system for further processing. The further processing may result in a variety of actions, such as updated control instructions and/or presentation instructions being presented to the output device controller.

Figure 7:
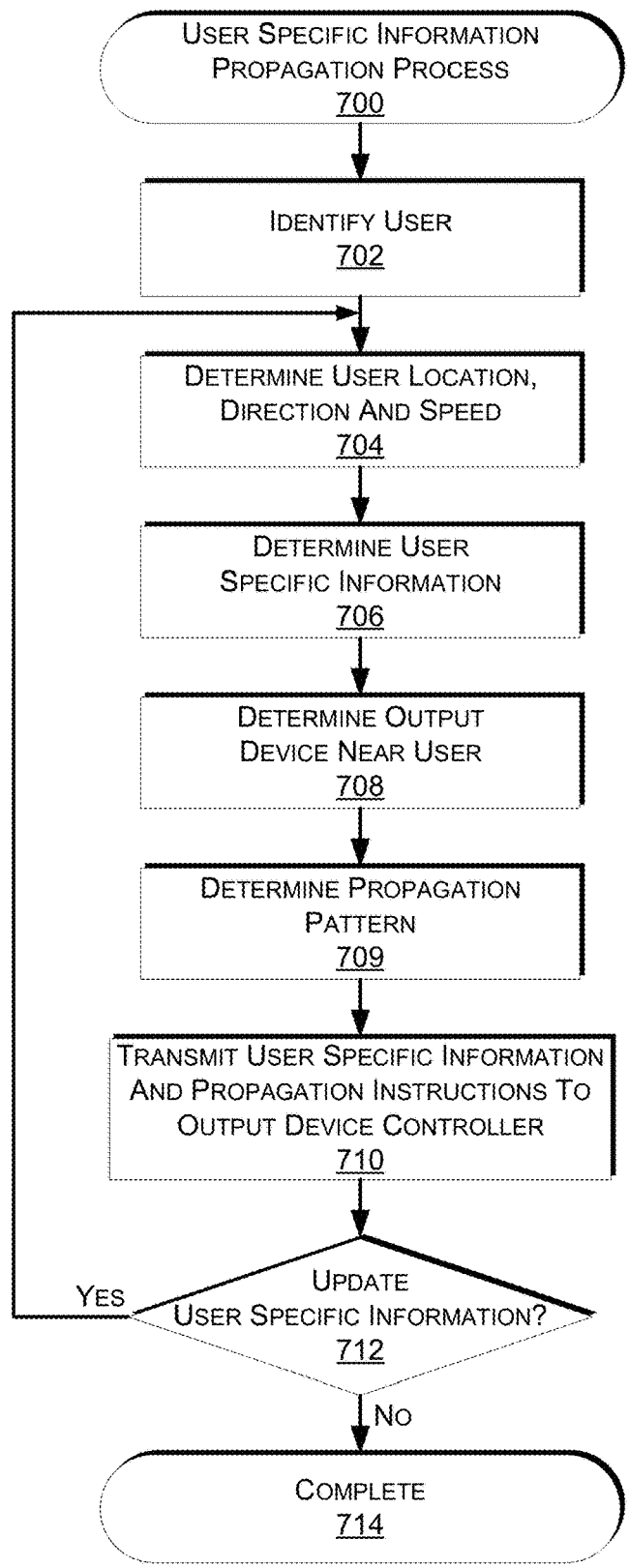
FIG. 7 is a flow diagram of an example user specific information propagation process, according to some implementations.
Figure 8:
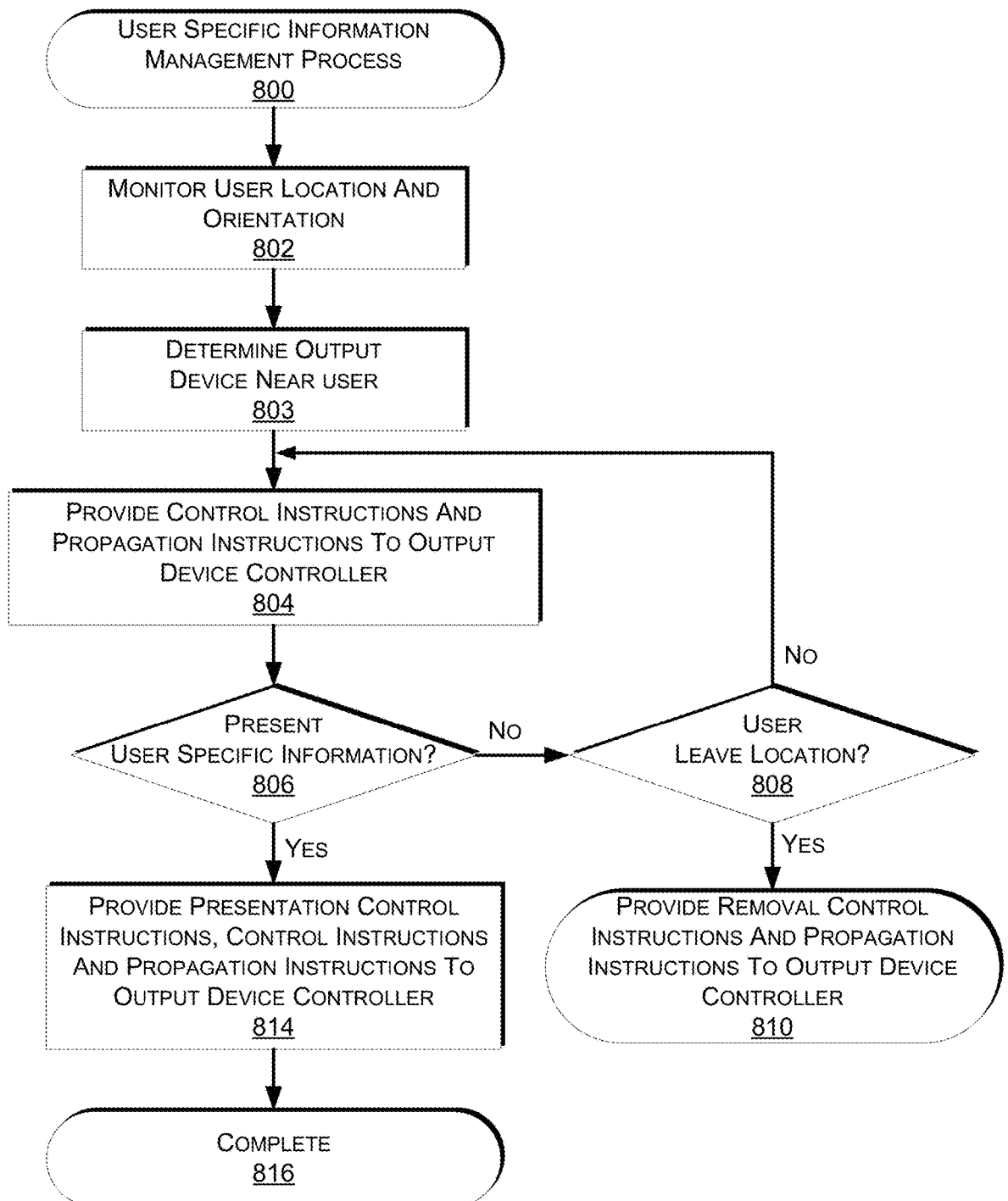
FIG. 8 is a flow diagram of an example user specific information management process, according to some implementations.

FIGS. 7-8 describe another example process for monitoring a user within the materials handling facility, providing user specific information and control instructions to output device controllers configured to control output devices near the user's location and for providing user specific information when desired by the user. The example processes of FIGS. 7-8 are described with respect to a peer-to-peer relationship between the output device controllers and a potentially varying client-server relationship between the inventory management system (server) and one or more of the output device controllers (client). For example, the inventory management system 150, may utilize one or more input devices (e.g., image capture devices) to monitor the location, direction, orientation and/or speed of the user and based on that information may query an output data store (discussed below) to identify an output device and corresponding output device controller. User specific information and/or control instructions are then provided to the output device along with propagation instructions for propagating the user specific information, control instruction and propagation instructions to output device controllers configured to control output devices that are adjacent or near the identified output device. When the output device controller receives the user specific information, control instructions and/or propagation instructions it executes any instructions for the output device controller and determines, based on the propagation instructions, whether to propagate the control instructions and/or user specific information to other output device controllers that are configured to control neighboring output devices. If it is to provide the user specific information, control instructions and/or propagation instructions, a neighbor count is decremented in the propagation instructions and the information is provided to one or more output device controllers. The neighbor count may identify the number of neighbor devices that are to receive the user specific information and/or the control instructions. For example, the neighbor count may identify to propagate the user specific information and/or the control instructions to five neighbors in one direction (the direction in which the user is moving) and one neighbor in the opposite direction.

The example process 700 of FIG. 7 begins by identifying a user in the materials handling facility, as in 702. Various techniques may be used for identifying a user within the materials handling facility. For example, one or more images of the user may be obtained and processed using image and/or facial recognition. The processed images may be compared with stored visual information about the user (e.g., facial features) and used to identify the user. In other examples, a user identifier may be provided by the user and/or detected by the inventory management system 150. A user identifier may be any unique identification that is associated with the user. For example, the user identifier may be an active tag, such as a radio frequency identification ("RFID") tag, visual tag, such as a barcode, bokode, etc., a user provided identifier (e.g., user name and password), biometric identification, or any other type of identifier that may uniquely identify the user.

In some implementations, distinguishing features of the user may also be detected and used to assist in monitoring the user as they move through the materials handling facility. For example, if the user is wearing a bright colored shirt, has a tattoo, is wearing a hat, etc., any of those distinguishing features may be detected and used to assist in monitoring the user. Likewise, the user's gate, cadence, body language, speed, etc. may be determined and used to monitor and/or identify the user while in the materials handling facility.

Returning to FIG. 7, in addition to identifying the user, the user's location, direction, and/or speed within the materials handling facility may be determined, as in 704. Similar to user identification, one or more image capture devices may capture images of the user and those images may be processed to determine the orientation, direction and speed of the user within the materials handling facility. Other input devices within the materials handling facility may also be used. For example, one or more pressure and/or weight sensors may be included in the floor of the materials handling facility and used to detect the steps or other movement of the user. Based on a series of detected steps/movement, the orientation, direction and/or speed of the user can be determined.

User specific information that is at least partially unique to the user and/or the current location of the user is also selected, as in 706. User specific information may vary for different users based on user preferences that are included in a user profile associated with the user. For example, a user may provide or be assigned a user identifier that may be presented to illustrate a path (e.g., pick path) the user is to take through the materials handling facility. For example, if the user is to follow a pick path that routes the user through the materials handling facility and past each item to be picked by the user (items on the user pick list), a user identifier that is unique to the user may be included in the user specific information. Likewise, other types of user specific information may be selected for the user. For example, item recommendations, suggestions or pairings with items currently in the user's possession may be identified and included in the user specific information. For example, if the user has a bottle of wine and it is determined that they are in the location of materials handling facility that stores cheese, an item recommendation for a cheese near the user's location may be generated and included in the user specific information.

The form type and content of user specific information may vary for each user. For example, some users may prefer only minimal information about the items at a location or only static representations of user identifiers for providing path guidance. In comparison, some users may be interested in receiving recommendations, item details, past purchase history, advertisements, etc. as part of the user specific information. Likewise, some user specific information may include animations that are presented to the user and/or used to provide path guidance. For example, the user identifier may be animated and follow the user through the materials handling facility providing animated path guidance that is specific to the user.

Based on the user's location within the materials handling facility, an output device is determined, as in 708. In some implementations, the output device closest to the user's location may be determined. Upon determining an output device, a propagation pattern is determined, as in 709. The propagation pattern may identify the number of neighbor output devices that are to receive the user specific information and/or the control instructions. For example, a set number of output devices adjacent to the identified device may be selected that are near the user for which the user specific information and control instructions are to be propagated. In one implementation, the six output devices nearest the determined output device may be determined. In other implementations, the direction and speed of the user may be considered and used as a factor in selecting output devices. For example, if the user is moving, the direction of the user may be determined and the propagation instructions may instruct the determined output device to provide the user specific information and control instructions to the output device controller that controls the output device that is adjacent to the determined output device and in the direction of the user's path. In addition, the neighbor count for that direction may be set to five. As the information is provided, the receiving output device control may decrement the neighbor count and provide the user specific information and/or control instructions to the next neighbor. This may continue until the neighbor count is decremented to zero. Likewise, the propagation instructions may instruct the determined output device to propagate the user specific information and/or control instructions with the output device controller configured to control the output device that is adjacent to the determined output device but behind the user. In a similar manner, the user specific information may be propagated to those adjacent output device controllers.

As will be appreciated, the user specific information and/or control instructions may vary for each output device and/or output device controller. For example, the control instructions and/or user specific information may be included in a stack of control instructions and each output device controller may receive the stack, use the top control instructions and/or user specific information and propagate the remainder of the stack to the next output device controller. In addition to propagating user specific information and/or control instructions, the output device controllers may exchange processing capabilities, network latency information and or other information that may be used by other output device controllers and/or the inventory management system 150 to synchronize the presentation of user specific information. Such information may be provided regardless of whether the communication is configured as peer-to-peer, client-server, or any other configuration. In another implementation, rather than using a neighbor count and/or a stack, each output device and/or output device controller may have a unique identifier. When the inventory management system 150 provides the user specific information, and/or control instructions, it may provide unique identifiers indicating which output devices and/or output device controllers are to receive the user specific instruction and/or control instructions.

In some implementations, output device controllers that receive control instructions and/or user specific information may periodically check to see if updated information (user specific information and/or control instructions) is available.

In another implementation, rather than providing propagation instructions, in some implementations, the output device controllers may determine where the respective output devices are positioned with respect to the user and determine whether to maintain the user specific information and/or control instructions. For example, the output device controller may poll the inventory management system for information regarding the position of output devices with respect to the user. Alternatively, the output device controller may include and/or control an input device (e.g., camera) that can be used to determine the position of the user with respect to the corresponding output devices. This information may be periodically updated as the user moves through the materials handling facility.

Returning to FIG. 7, user specific information and the propagation pattern is transmitted to the output device controller configured to control the determined output device, as in 710. As the user moves through the materials handling facility and/or interacts with items in the materials handling facility, a determination is made as to whether some or all of the user specific information is to be updated, as in 712. For example, if the user picks an item, the user specific information for the output device near the picked item may be updated to include addition information about the picked item. Likewise, user specific information for other output devices may be updated based on the picked item. For example, if the user picks an item, other related items may be identified and user specific information for output devices near those related items may be updated to include information and/or recommendations for the user to identify those related items. If it is determined that the user specific information is to be updated, the example process returns to block 704 and continues. If it is determined that the user specific information is not to be updated, the example process 700 completes, as in 714.

FIG. 8 is a flow diagram of an example user specific information management process 800, according to some implementations. The example process 800 begins by monitoring a user location and orientation within a materials handling facility, as in 802. Similar to identifying a user, discussed above, a variety of techniques may be used to monitor the location and orientation of a user. For example, one or more images of the user may be captured and processed to identify and monitor the location of the user as well as determine the orientation of the user. For example, if a distinguishing identifier (e.g., yellow shirt, tattoo) has been associated with the user, the captured images may be processed using object recognition to identify the distinguishing feature(s). Likewise, the object recognition can be used to determine the orientation of the user. In other examples, other user identifiers may be received and used to monitor the user. Likewise, one or more floor sensors (e.g., weight sensors, pressure sensors, load cells) may be included in the floor and used to determine the orientation of the user. For example, if the user is standing, the floor sensors may be used to determine the location and position of each of the user's feet. The location and position of each foot may be used to determine, or assist in determining, the orientation of the user.

In some implementations, if the user is moving, the speed and direction of the user may also be determined. For example, the processed images and/or information from the floor sensors may be used to determine the direction and speed of the user as they move through the materials handling facility.

Based on the determined location and orientation of the user (and optionally the direction and speed of the user), an output device near the user is determined, as in 803. Control instructions are then transmitted to the output device controller that is configured to control the determined output device, as in 804. As discussed above, an output device controller may control one or more output devices. Likewise, the control instructions, like the user specific information, may be provided as a stack or set of control instructions, which may be the same or different for each output device. The propagation instructions may identify multiple sets of neighbors that correspond to different areas of output devices. For example, one set of neighbors may be adjacent and to the left of the output device. Another set of neighbors may be adjacent and to the right of the output device. Other neighbors may be above, below and/or across from the output device. As the control instructions and/or user specific information is propagated to different neighbors, each neighbor takes action on the information and, if appropriate, propagates the user specific information and/or control instructions to the next neighbor.

The location, orientation, direction and/or speed of the user may be monitored and a determination made as to whether user specific information for any of the output devices is to be presented, as in 806. For example, the user may specify or prefer to only have user specific information presented when they are stopped and looking in the direction of an output device (e.g., looking at an inventory location that includes an output device). In other implementations, if the user is moving, the user identifier may be presented on the output device adjacent to the user and on a select number of output devices in front of the user to assist in providing guidance along a pick path. In some implementations, the user specific information may be animated and transition across multiple output devices as the user moves.

If it is determined that the user specific information is not to be presented, a determination is made as to whether the user has left the location, as in 808. It may be determined that a user has left a location, for example, if the user moves a specific distance away from the output device, if the user moves to another aisle within the materials handling facility, if the user moves to another location within the materials handling facility, if the user leaves the materials handling facility, etc. If it is determined that the user has left the location, control instructions to delete, invalidate or otherwise remove the user specific information are provided to the appropriate output device controller and propagated accordingly to neighbor output device controllers, as in 810. However, if it is determined that the user has not left the location, the example process returns to decision block 806 and continues.

Returning to decision block 806, if it is determined that user specific information is to be presented to the user, the output device(s) nearest the user and/or in the direction of the user's orientation are determined, as in 812. For example, the captured images of the user and or information obtained for floor sensors may be processed to determine the user's location and/or orientation and the output device data store may be queried to identify the appropriate output device(s) at that location. For the determined output device(s), control instructions may be transmitted from the inventory management system to the output device controller configured to control the determined output device instructing the output device controller to present the user specific information, as in 814. In this example, the determined output device and output device controller may be the same or different than the output device controller that originally received the user specific information and/or the control instructions.

Upon transmitting the control instructions, the example process 800 returns to block 804 and continues. For example, updated control instructions for adjacent output devices may be transmitted and propagated instructing those devices to render stored user specific information.

Figure 9:
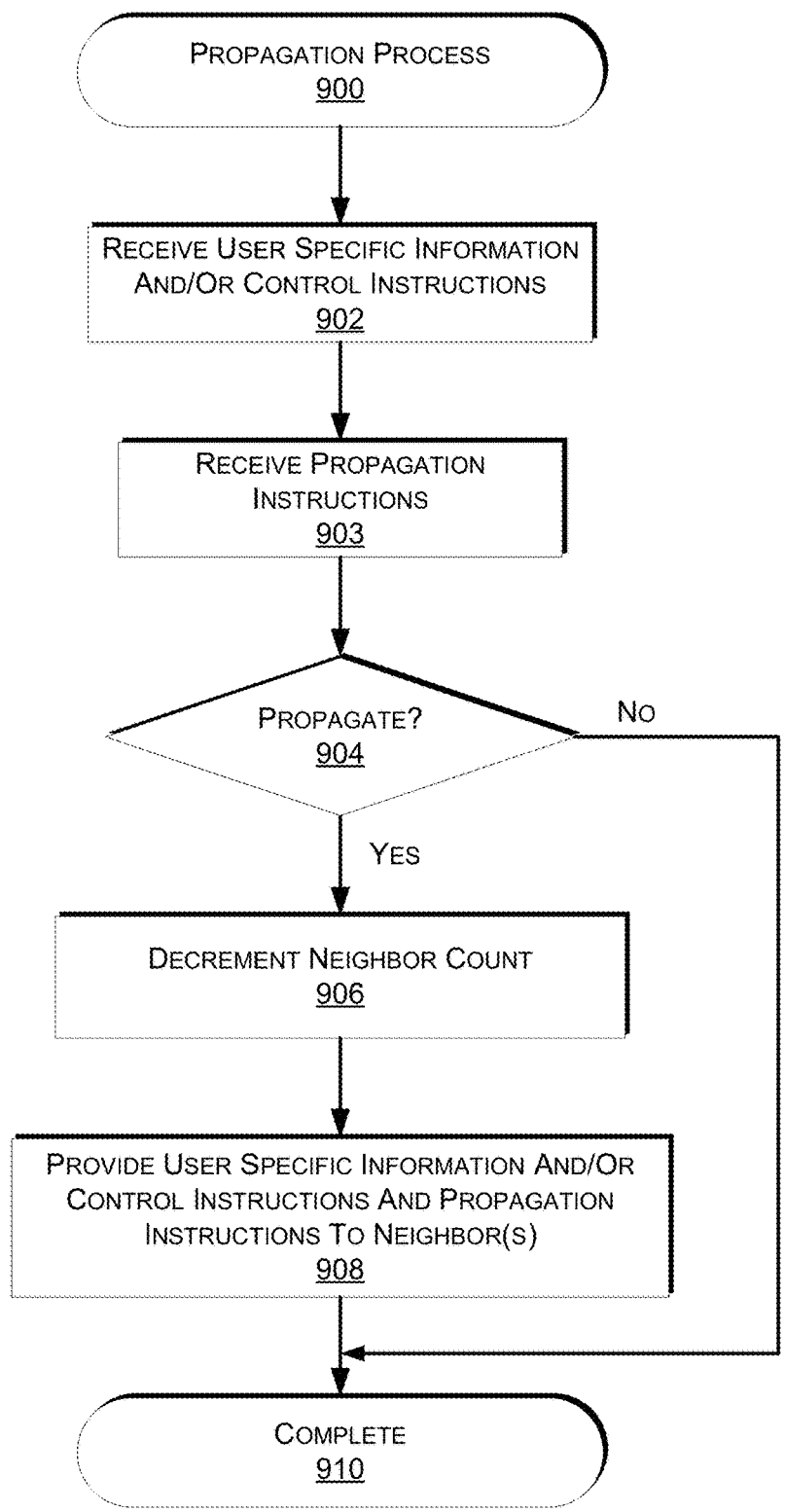
FIG. 9 is a flow diagram of an example propagation process, according to some implementations.

FIG. 9 is a flow diagram of an example propagation process, according to some implementations. The example process 900 begins with an output device controller receiving user specific information and/or control instructions, as in 902. In addition to receiving the user specific information and/or control instructions, the output device controller may receive propagation instructions, as in 903. As discussed above, the propagation instructions may identify how/whether the user specific information and/or control instructions are to be propagated. In one implementation, each output device controller may have six potential neighbors (left, right, above, below, across and behind) and the propagation instructions may identify how many neighbors in each direction are to receive the user specific information and/or control instructions. For example, the propagation instructions may include a neighbor count for each potential neighbor identifying which neighbors are to receive the control instructions and/or the user specific information. In other implementations, an output device may have more or fewer neighbor output devices. Likewise, output devices may be the same or different types of output devices. For example, one or more output devices may be a display while others may be video projectors, audio outputs, etc.

Based on the received propagation instructions, a determination is made as to whether the user specific information and/or control instructions are to be propagated, as in 904. For example, if the neighbor count for a potential neighbor is zero or if no other devices are identified, it may be determined that the user specific information and/or control instructions are not to be propagated in that direction. If the neighbor count is a positive number, it may be determined that the user specific information and/or control instructions are to be propagated to that neighbor. In other implementations, rather than utilizing a neighbor count and/or received propagation instructions, the output device controller may determine the position of the controlled output devices with respect to the user and determine whether to propagate the user specific information and/or control instructions to output device controllers that are configured to control neighboring output devices. If the user specific information is to be propagated, the neighbor count for the direction of the propagation is decremented, as in 906, and the user specific information, control instructions and propagation instruction (e.g., decremented neighbor count) for that neighbor is provided, as in 908. In some implementations, the user specific information and/or control instructions may be different for each neighbor and/or for different sets of neighbors. In such an instance, the user specific information and/or control instructions may include different sets of information and/or instructions for each neighbor. As the user specific information and/or control instructions are propagated, each receiving output device controller obtains the appropriate user specific information and/or control instructions and continues the propagation.

If it is determined that the user specific information and/or control instructions are not to be propagated or after propagating the user specific information and/or control instructions, the example process 900 completes, as in 910.

Figure 10:
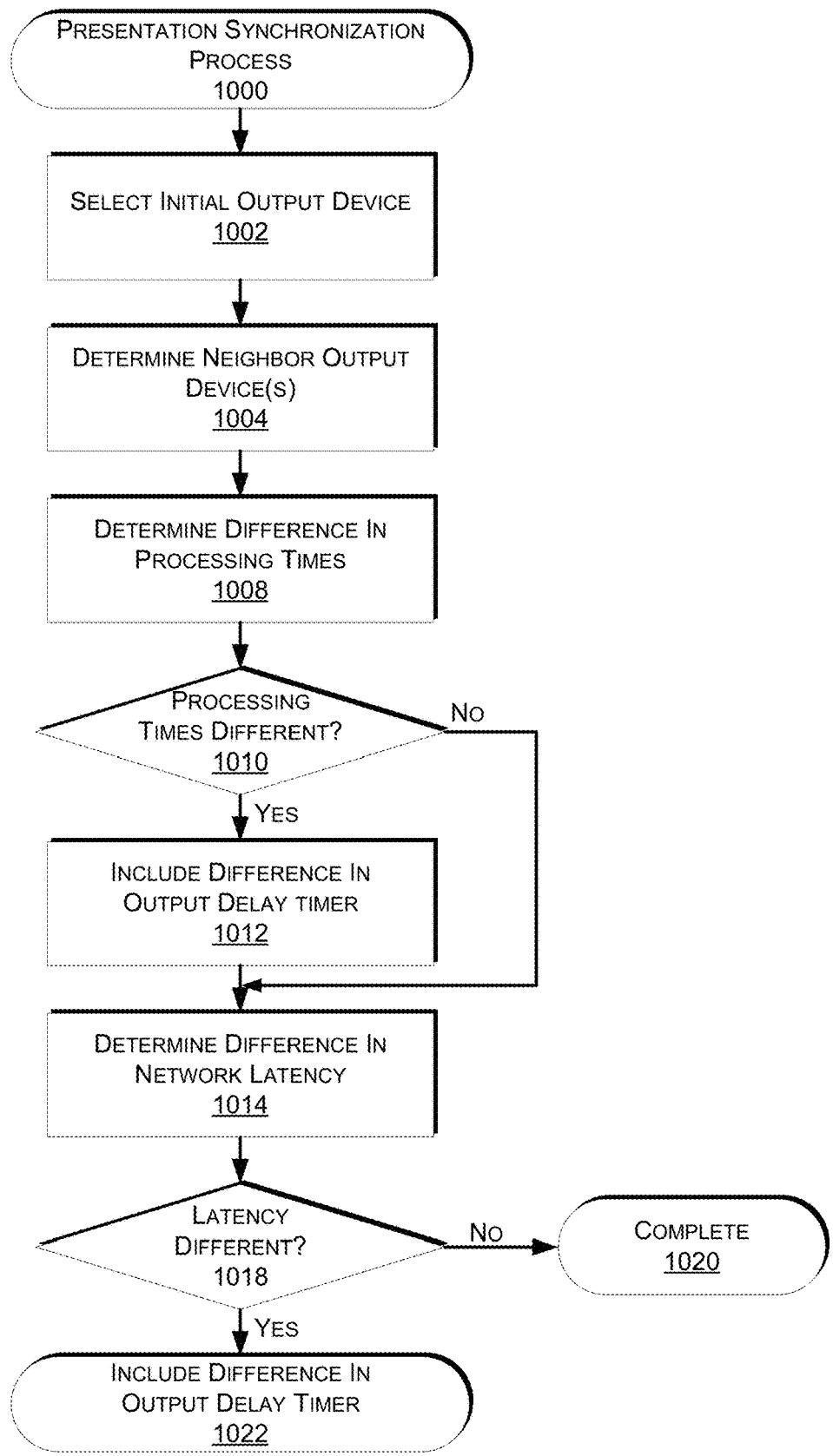
FIG. 10 is a flow diagram of an example process for synchronizing the presentation of content across multiple output devices, according to some implementation.

FIG. 10 is a flow diagram of an example process 1000 for synchronizing the presentation of content across multiple output devices, according to some implementations. As noted above, in instances where user specific information is transitioning between output devices, such as animated user specific information, it may be necessary to delay processing and/or presentation on one or more of the output devices such that the presented information is synchronized and transitions properly. The example process 1000 begins be selecting an initial output device upon which the user specific information may be presented, as in 1002. Likewise, one or more neighbor output devices adjacent to the initial output device are determined, as in 1004. As discussed above, a neighbor output device may be an adjacent device, a device above, below across from or behind the initial output device. In some instances, the neighbor device may be physically separated from the initial output device. For example, if the initial output device is at the end of an aisle, the neighbor output device may be on a shelf at the beginning of the next aisle.

Once the neighbor output device(s) has been selected, a difference in presentation processing time for each may be determined, as in 1008. For example, the time required for each output device controller to process and initiate projection of user specific information may be maintained and/or determined for each output device controller configured to control the initial output device and the neighbor output device(s). A determination may then be made as to whether the processing time between the initial output device and the neighbor output device are different, as in 1010. If it is determined that the processing times are different, the determined difference is included in an output delay timer, as in 1012. For example, if two neighbor output device controllers have different processing times, the example process 1000 may determine the difference between the processing times and set that difference as the output delay timer. However, if the processing time for both output device controllers is the same, or after including the difference in the output delay timer, a difference between the network latency for each respective output device controller is determined, as in 1014. Other factors, such as clock differences between output device controllers, refresh rates, etc. may also be considered and included as a difference in the delay timer. For example, the output device controller configured to control the initial output device, may have higher or lower network latency than the output device controller configured to control the neighbor output device controller.

If it is determined that the network latency is different, the determined difference is included in the output delay timer, as in 1022. If there is no difference in the network latency, the example process 1000 completes, as in 1024.

Figure 11:
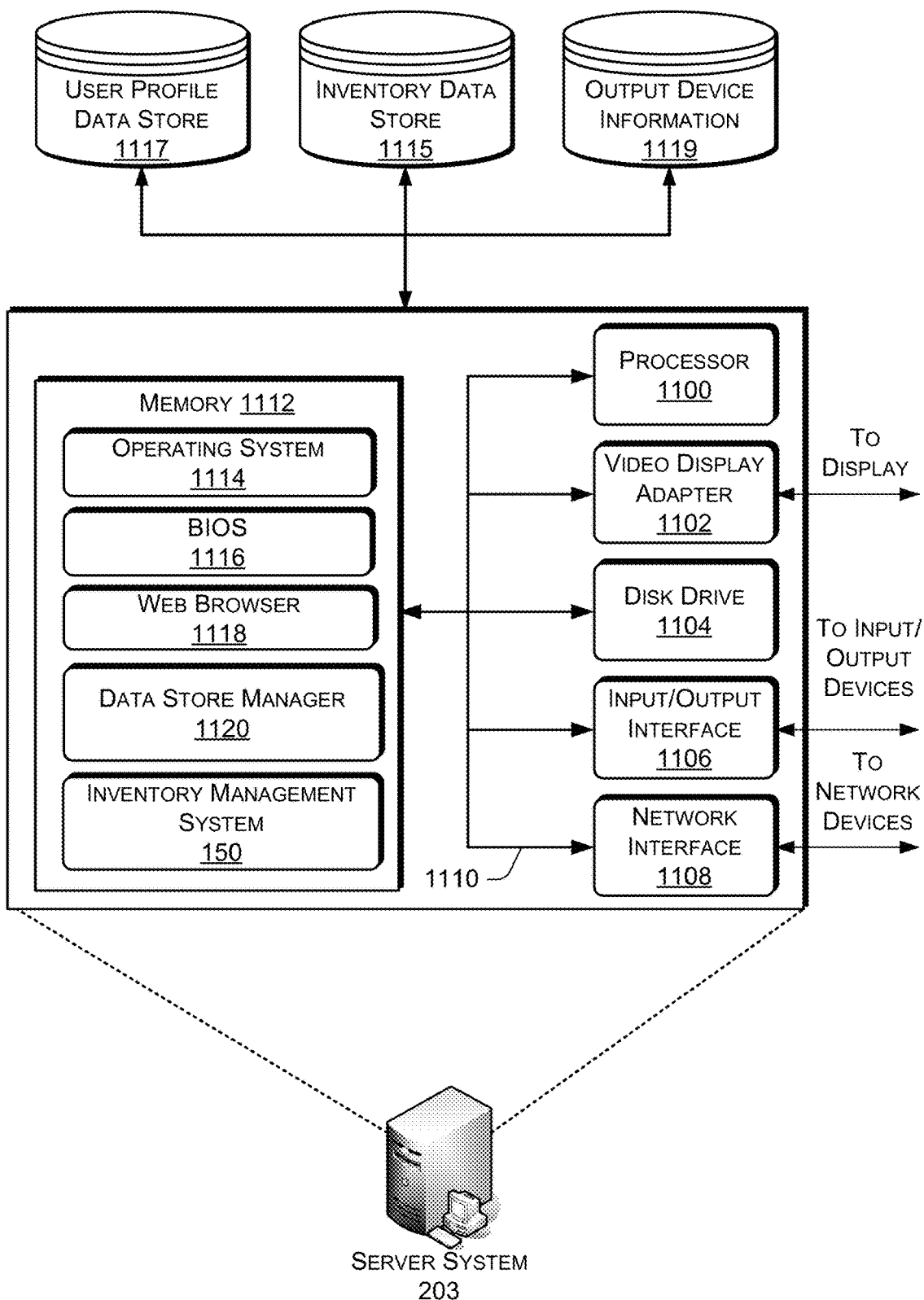
FIG. 11 is a block diagram of an illustrative implementation of a server system that may be used with various implementations.

FIG. 11 is a pictorial diagram of an illustrative implementation of a server system, such as the server system 203 that may be used in the implementations described herein. The server system 203 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 203 to monitor and configure operation of the server system 203. The input/output interface 1106 likewise communicates with external input/output devices not shown in FIG. 11, such as a mouse, keyboard, scanner, or other input and output devices that can be operated by an operator of the server system 203. The network interface 1108 includes hardware, software, or any combination thereof, to communicate with other computing devices. For example, the network interface 1108 may be configured to provide communications between the server system 203 and other computing devices via the network 202, as shown in FIG. 2 and FIG. 3.

The memory 1112 generally comprises random access memory (RAM), read-only memory (ROM), flash memory, and/or other volatile or permanent memory. The memory 1112 is shown storing an operating system 1114 for controlling the operation of the server system 203. A binary input/output system (BIOS) 1116 for controlling the low-level operation of the server system 203 is also stored in the memory 1112.

The memory 1112 additionally stores program code and data for providing network services that allow the inventory management system 150 to identify users and/or items within the materials handling facility. Accordingly, the memory 1112 may store a browser application 1118. The browser application 1118 comprises computer executable instructions, that, when executed by the processor 1100 generate or otherwise obtain configurable markup documents such as Web pages. The browser application 1118 communicates with a data store manager application 1120 to facilitate data exchange between the inventory data store 1115, the user profile data store 1117 and/or the output device information data store 1119.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 1115, 1117, 1119 as needed to execute aspects of the inventory management system 150.

The data stores 1115, 1117, 1119 can include several separate data tables, databases or other data storage mechanisms and media for storing data relating to a particular aspect. For example, the data stores 1115, 1117, 1119 illustrated include mechanisms for inventory information, user profile information, output device information, output device controller information, etc., which can be used to identify users or develop user paths for users, develop user specific information, locate output devices, etc.

It should be understood that there can be many other aspects that may be stored in the data stores 1115, 1117, 1119. The data stores 1115, 1117, 1119 are operable, through logic associated therewith, to receive instructions from the server system 203 and obtain, update or otherwise process data in response thereto.

The memory 1112 may also include the inventory management system 150, discussed above. The inventory management system 150 may be executable by the processor 1100 to implement one or more of the functions of the server system 203. In one implementation, the inventory management system 150 may represent instructions embodied in one or more software programs stored in the memory 1112. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
under control of one or more computing devices configured with executable instructions,
selecting a first output device controller configured to control a first output device;
determining a difference between a first processing time of the first output device controller and a second processing time of a second output device controller, wherein the second output device controller is configured to control a second output device that is a neighbor output device of the first output device, wherein the first processing time indicates at least a time required for the first output device controller to process and initiate presentation of a user specific information; and
generating an output delay timer based at least in part on the determined difference, wherein the second output device controller adjusts an initiation time of a presentation of the user specific information based at least in part on the output delay timer.

2. The method of claim 1, wherein:
the output delay timer is positive when the first processing time of the first output device controller is longer than the second processing time of the second output device controller; and
the second output device controller does not initiate a presentation of the user specific information until after a positive time represented by the output delay timer has elapsed.

3. The method of claim 1, further comprising:
determining a difference between a first network latency of the first output device controller and a second network latency of the second output device controller; and
wherein the output delay timer is further based at least in part on the determined difference between the first network latency of the first output device controller and the second network latency of the second output device controller.

4. The method of claim 1, wherein the output delay timer is included in a control instruction provided to the second output device for presentation of the user specific information.

5. The method of claim 4, wherein:
the second output device controller receives instructions to present the user specific information on the second output device controlled by the second output device controller;
waits for an expiration of the output delay timer; and
presents the user specific information on the second output device.

6. The method of claim 5, wherein:
the user specific information includes an animation; and
the user specific information is presented at a time so the animation presented on the first output device transitions to the second output device.

7. The method of claim 1, wherein the output delay timer delays processing or presentation by the second output device controller such that the user specific information is synchronized between the first output device and the second output device.

8. The method of claim 1, wherein the second processing time indicates at least a second time required for the second output device controller to process and initiate presentation of the user specific information.

9. A system, comprising:
a first output device;
a second output device;
a first output device controller operable to control at least the first output device;
a second output device controller operable to control at least the second output device; and
a computing system, including:
one or more processors; and
a memory storing program instructions that when executed by the one or more processors cause the one or more processors to at least:
select the first output device controller;
determine that the second output device is a neighbor output device of the first output device;
determine that a first processing time of the first output device controller is longer than a second processing time of the second output device controller; and
generate an output delay timer based at least in part on the determination that the first processing time is longer than the second processing time, wherein the second output device controller adjusts an initiation time of a presentation of user specific information based at least in part on the output delay timer.

10. The system of claim 9, wherein the program instructions that when executed by the one or more processors further cause the one or more processors to at least:
determine a difference between a first network latency of the first output device controller and a second network latency of the second output device controller; and
wherein the output delay timer is further based at least in part one the determined difference between the first network latency of the first output device controller and the second network latency of the second output device controller.

11. The system of claim 9, wherein the neighbor output device is at least one of adjacent the first output device, above the first output device, below the first output device, across from the first output device, or behind the first output device.

12. The system of claim 9, wherein the program instructions that when executed by the one or more processors further cause the one or more processors to at least:
determine at least one of a clock difference between the first output device controller and the second output device controller or a refresh rate difference between the first output device controller and the second output device controller; and
wherein the output delay timer is further generated based at least in part on one or more of the clock difference between the first output device controller and the second output device controller or the refresh rate difference between the first output device controller and the second output device controller.

13. The system of claim 9, wherein the program instructions further cause the one or more processors to at least:
send a first control instruction to the first output device controller instructing the first output device controller to output the user specific information; and
send a second control instruction to the second output device controller, wherein the second control instruction includes the output delay timer.

14. The system of claim 13, wherein:
the second output device controller receives the second control instruction to present user specific information on the second output device controlled by the second output device controller;
waits for an expiration of the output delay timer; and
presents the user specific information on the second output device.

15. A computer implemented method, comprising:
selecting a first output device controller configured to control a first output device;
determining a second output device that is a neighbor output device of the first output device;
determining a difference between a first processing time of the first output device controller and a second processing time of a second output device controller, wherein the second output device controller is configured to control the second output device; and
generating an output delay timer based at least in part on the determined difference, wherein:
the output delay timer has a duration when the first processing time of the first output device controller is less than the second processing time of the second output device controller; and
a presentation of a user specific information by the first output device is not initiated until after the duration has elapsed.

16. The computer implemented method of claim 15, further comprising:
determining a difference between a first network latency of the first output device controller and a second network latency of the second output device controller; and
wherein the output delay timer is further based at least in part one the determined difference between the first network latency of the first output device controller and the second network latency of the second output device controller.

17. The computer implemented method of claim 15, wherein:
the user specific information includes an animation; and
the user specific information is presented at a time so that a transition of the animation presented on the first output device to the second output device is synchronized.

18. The computer implemented method of claim 15, wherein the neighbor output device is at least one of adjacent the first output device, above the first output device, below the first output device, across from the first output device, or behind the first output device.

19. The computer implemented method of claim 15, wherein the first processing time indicates at least a time required for the first output device controller to process and initiate presentation of the user specific information.

20. The computer implemented method of claim 15, further comprising:
sending a first control instruction to the first output device controller instructing the first output device controller to output the user specific information; and
sending a second control instruction to the second output device controller, wherein the second control instruction includes the output delay timer.

* * * * *